United States Patent
Davis et al.

(10) Patent No.: US 11,209,086 B2
(45) Date of Patent: Dec. 28, 2021

(54) WET-FACE/DRY-FACE SEAL AND METHODS OF OPERATION

(71) Applicant: United Technologies Corporation, Farmington, CT (US)

(72) Inventors: Todd A. Davis, Tolland, CT (US); William G. Sheridan, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 204 days.

(21) Appl. No.: 16/173,465

(22) Filed: Oct. 29, 2018

(65) Prior Publication Data

US 2020/0132196 A1 Apr. 30, 2020

(51) Int. Cl.
*F16J 15/34* (2006.01)
*F01D 25/18* (2006.01)

(52) U.S. Cl.
CPC ........ *F16J 15/3412* (2013.01); *F01D 25/183* (2013.01)

(58) Field of Classification Search
CPC ...... F16J 15/3412; F16J 15/342; F16J 15/324; F16J 15/182; F16J 15/162; F01D 25/183; F01D 5/082; F16C 37/00
See application file for complete search history.

(56) References Cited

U.S. PATENT DOCUMENTS

| | | | | |
|---|---|---|---|---|
| 2,956,824 A * | 10/1960 | Kuchler | ................ | F01D 11/003 277/500 |
| 2,992,842 A * | 7/1961 | Shevchenko | ......... | F01D 11/003 277/306 |
| 3,025,115 A * | 3/1962 | Shevchenko | ........... | F16C 33/76 384/481 |
| 3,147,013 A * | 9/1964 | Tracy | .................... | F04D 29/126 277/400 |
| 4,196,911 A * | 4/1980 | Matsushita | ............ | F16J 15/342 277/401 |
| 4,260,166 A * | 4/1981 | Frosch | ................... | F16J 15/342 277/401 |

(Continued)

FOREIGN PATENT DOCUMENTS

| EP | 1496294 A1 | 1/2005 |
|---|---|---|
| EP | 3385511 A2 | 10/2018 |

(Continued)

OTHER PUBLICATIONS

European Search Report dated Mar. 19, 2020 for European Patent Application No. 19205728.9.

*Primary Examiner* — Eugene G Byrd
(74) *Attorney, Agent, or Firm* — Bachman & LaPointe, P. C.

(57) ABSTRACT

A seal system has: a first member; a seal carried by the first member and having a seal face; and a second member rotatable relative to the first member about an axis. The second member has: a seat, the seat having a seat face in sliding sealing engagement with the seal face; and a circumferential array of passageway legs open to the seat face; and an oil pump for delivering oil via one or more first outlets to the passageway legs in at least a first mode of operation. The oil pump is coupled to one or more second outlets to deliver oil to a backside of the seat in at least a second mode of operation.

21 Claims, 6 Drawing Sheets

(56) References Cited

U.S. PATENT DOCUMENTS

| | | | | |
|---|---|---|---|---|
| 4,406,459 A | * | 9/1983 | Davis | F16J 15/3404 |
| | | | | 277/401 |
| 4,687,346 A | * | 8/1987 | Suciu | F01D 25/164 |
| | | | | 277/385 |
| 4,928,978 A | * | 5/1990 | Shaffer | F01D 25/183 |
| | | | | 277/401 |
| 4,990,054 A | * | 2/1991 | Janocko | F04D 9/001 |
| | | | | 415/111 |
| 5,193,974 A | * | 3/1993 | Hufford | F04D 1/12 |
| | | | | 277/401 |
| 5,464,227 A | * | 11/1995 | Olson | F16J 15/3404 |
| | | | | 277/400 |
| 5,622,438 A | * | 4/1997 | Walsh | F01D 25/162 |
| | | | | 384/624 |
| 5,658,127 A | * | 8/1997 | Bond | F01D 25/183 |
| | | | | 277/399 |
| 8,215,645 B1 | * | 7/2012 | Aho, Jr. | F16J 15/342 |
| | | | | 277/370 |
| 8,444,153 B2 | | 5/2013 | Gaebler et al. | |
| 9,920,710 B2 | | 3/2018 | Dawson et al. | |
| 10,174,629 B1 | * | 1/2019 | Valva | F16C 33/667 |
| 10,422,245 B2 | * | 9/2019 | Cigal | F16J 15/164 |
| 10,662,812 B2 | * | 5/2020 | Walker | F16N 7/16 |
| 10,746,051 B2 | * | 8/2020 | Walsh | F16J 15/3404 |
| 10,767,510 B2 | * | 9/2020 | Amador | F01D 25/183 |
| 2004/0094901 A1 | * | 5/2004 | Gittler | F03B 11/006 |
| | | | | 277/408 |
| 2004/0232622 A1 | * | 11/2004 | Gozdawa | F16J 15/342 |
| | | | | 277/401 |
| 2007/0222160 A1 | * | 9/2007 | Roberts-Haritonov | |
| | | | | F16J 15/342 |
| | | | | 277/387 |
| 2009/0189355 A1 | * | 7/2009 | Ueda | F16J 15/342 |
| | | | | 277/350 |
| 2013/0043331 A1 | | 2/2013 | Snodgrass et al. | |
| 2013/0199206 A1 | * | 8/2013 | Cigal | F02C 3/107 |
| | | | | 60/803 |
| 2014/0010648 A1 | * | 1/2014 | Muldoon | F01D 25/16 |
| | | | | 415/230 |
| 2016/0097457 A1 | * | 4/2016 | Sun | F16J 15/3412 |
| | | | | 277/400 |
| 2016/0273657 A1 | * | 9/2016 | Amador | F16J 15/342 |
| 2016/0281537 A1 | * | 9/2016 | Lucas | F01D 25/18 |
| 2018/0003069 A1 | * | 1/2018 | Bidkar | F01D 25/22 |
| 2018/0045316 A1 | * | 2/2018 | Kovacik | F16J 15/324 |
| 2018/0087404 A1 | | 3/2018 | Lighty | |
| 2020/0182090 A1 | * | 6/2020 | Davis | F01D 25/186 |

FOREIGN PATENT DOCUMENTS

| | | | | |
|---|---|---|---|---|
| JP | 59077007 A | * | 5/1984 | F01D 25/183 |
| JP | 2006105365 A | * | 4/2006 | F16J 15/342 |

* cited by examiner

WET-FACE/DRY-FACE SEAL AND METHODS OF OPERATION

BACKGROUND

The disclosure relates to gas turbine engines. More particularly, the disclosure relates to cooling of carbon seals in gas turbine engines.

Carbon seals are commonly used to seal between relatively rotating components in gas turbine engines. In typical situations, the annular carbon seal is spring biased into engagement with an annular seat (typically metallic such as a steel). Often, the carbon seal is on non-rotating static structure and the seat rotates with one of the engine shafts. The sliding engagement causes frictional heating. The heat must be dissipated. With a rotating seat, it is common to use oil cooling. Generally, oil-cooled carbon seals are divided into two categories: "dry face" seals wherein the oil passes through passageways in the seat without encountering the interface between seal face and seat face; and "wet face" seals wherein the oil passes through the seat to the interface so that the oil that flows through the seat cools the seat but then lubricates the interface to further reduce heat generation.

For both forms of seals, the oil may be delivered through a nozzle and slung radially outward by the rotating component and collected in a radially outwardly closed and inwardly open collection channel from which the passageways extend further radially outward.

U.S. Pat. No. 4,406,459 (the '459 patent), Davis et al., Sep. 27, 1983, "Oil Weepage Return for Carbon Seal Plates" shows a seal with two sets of passageways through the seat. One set delivers oil to the interface as a wet face seal. Another set helps centrifugally pump out oil that has weeped radially inward from the interface.

United States Patent Application Publication 20180045316A1 (the '316 publication), Kovacik et al., Feb. 15, 2018, "Hydrodynamic Seal Seat Cooling Features" shows a dry face seal wherein the oil passageways have two legs: an upstream leg receiving oil from a collection notch which in turn has collected the oil from a nozzle; and a downstream leg extending radially outward from the upstream leg generally close to and parallel to the sealing interface.

SUMMARY

One aspect of the disclosure involves a seal system comprising: a first member; a seal carried by the first member and having a seal face; and a second member rotatable relative to the first member about an axis. The second member has: a seat, the seat having a seat face in sliding sealing engagement with the seal face; and a circumferential array of passageway legs open to the seat face. The seal system has an oil pump for delivering oil via one or more first outlets to the passageway legs in at least a first mode of operation. The seal system further comprises one or more second outlets, the oil pump coupled to the one or more second outlets to deliver oil to a backside of the seat in at least a second mode of operation.

A further embodiment of any of the foregoing embodiments may additionally and/or alternatively include the seal being a carbon seal.

A further embodiment of any of the foregoing embodiments may additionally and/or alternatively include the seat being steel.

A further embodiment of any of the foregoing embodiments may additionally and/or alternatively include the seal and seat being full annular.

A further embodiment of any of the foregoing embodiments may additionally and/or alternatively include a spring biasing the seal into engagement with the seat.

A further embodiment of any of the foregoing embodiments may additionally and/or alternatively include one or more valves for switching between the first mode and the second mode.

A further embodiment of any of the foregoing embodiments may additionally and/or alternatively include the one or more valves comprising a first valve positioned along a flowpath from the pump to the one or more first outlets downstream of a branching to the one or more second outlets.

A further embodiment of any of the foregoing embodiments may additionally and/or alternatively include: the one or more valves consisting of a single valve; the one or more first outlets consisting of a single first outlet; and the one or more second outlets consisting of a single second outlet.

A further embodiment of any of the foregoing embodiments may additionally and/or alternatively include the one or more valves being positioned to allow flow through the second outlets in the first mode and the second mode and block flow through the first outlets in the second mode.

A further embodiment of any of the foregoing embodiments may additionally and/or alternatively include a nozzle body wherein: one of the first outlets is in a first insert in the nozzle body; and one of the second outlets is in a second insert in the nozzle body.

A further embodiment of any of the foregoing embodiments may additionally and/or alternatively include a valve in the nozzle body positioned to selectively block flow through the first insert.

A further embodiment of any of the foregoing embodiments may additionally and/or alternatively include a gas turbine engine including the seal system wherein the second member is a shaft.

A further embodiment of any of the foregoing embodiments may additionally and/or alternatively include the gas turbine engine further comprising: a speed sensor; and a controller configured to switch between the first mode and the second mode responsive to output from the speed sensor.

A further embodiment of any of the foregoing embodiments may additionally and/or alternatively include a method for using the seal system. The method comprises shifting between the first mode and the second mode.

A further embodiment of any of the foregoing embodiments may additionally and/or alternatively include: in the first mode, oil not being delivered via the second outlets; and in the second mode, oil not being delivered via the first outlets.

A further embodiment of any of the foregoing embodiments may additionally and/or alternatively include: in the first mode, oil also being delivered via the second outlets; and in the second mode, oil not being delivered via the first outlets.

A further embodiment of any of the foregoing embodiments may additionally and/or alternatively include: in the first mode, the relative rotation being at a first speed; and in the second mode, the relative rotation being at a second speed, less than the first speed.

A further embodiment of any of the foregoing embodiments may additionally and/or alternatively include: in the first mode, the relative rotation being at a first speed; and in the second mode, the relative rotation is at a second speed, less than the first speed.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
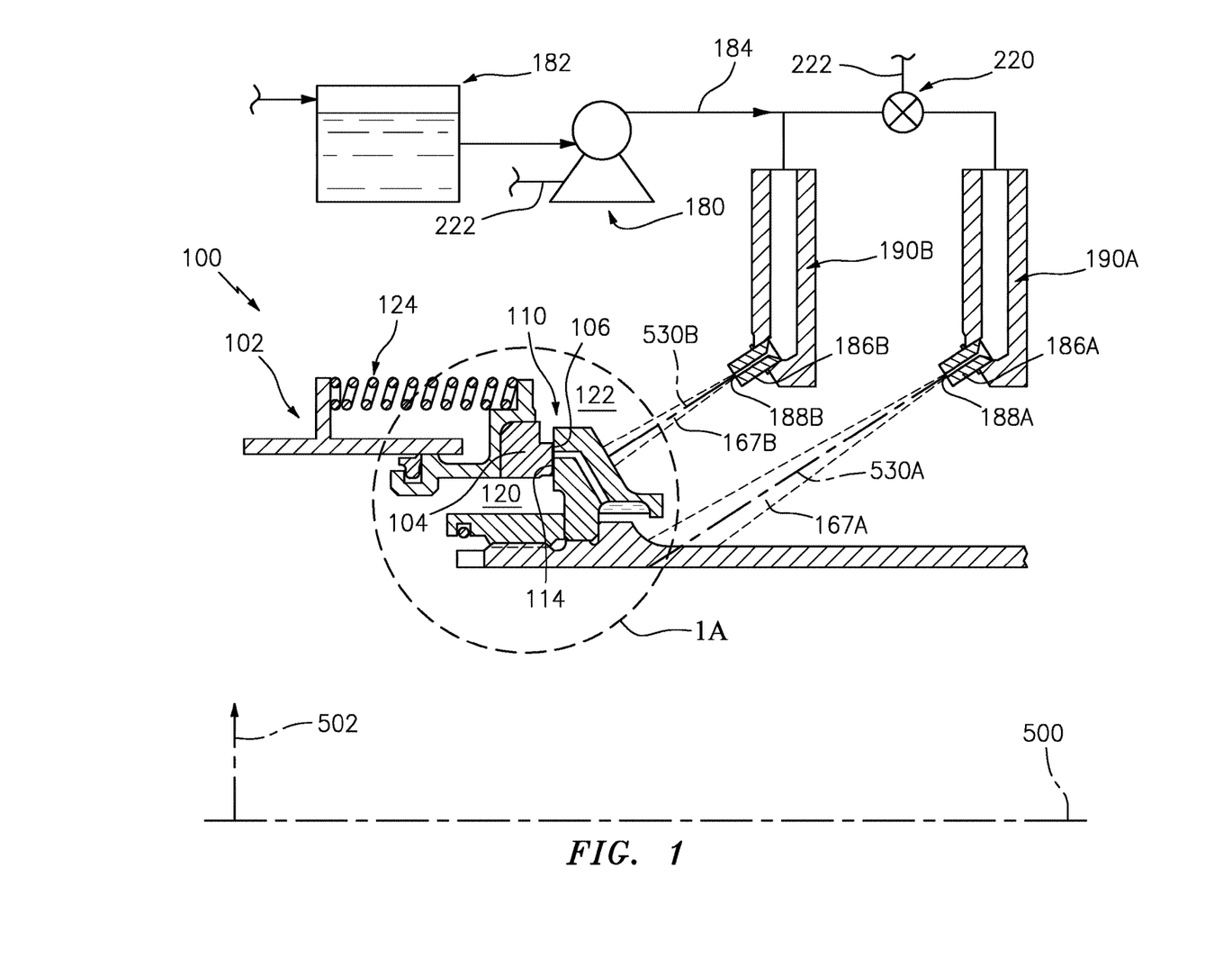
FIG. 1 is a partial partially schematic central axial sectional view of a first seal system.

FIG. 1 shows a seal system 100 having a first member 102 carrying a seal 104. The exemplary seal 104 is a carbon seal having a seal surface or face 106. The exemplary seal 104 is formed as a body of revolution about an axis 500 which is an axis of relative rotation between the first member 102 and a second member 110. FIG. 1 further shows an outward radial direction 502. The exemplary seal face 106 is a radial face. The second member 110 comprises a piece 112 (seat piece) forming a seat for the seal with a seat surface or face 114 in sliding sealing engagement with the seal face 106 at a sealing interface.

The seal 104 may be biased into axially compressive engagement with the seat face 114 via one or more factors including pressure bias and spring loading. The seal 104 is shown as sealing a space or region 120 inboard of the sealing interface from a space or region 122 outboard. Depending upon configuration, the pressure difference may bias the seal in either direction. FIG. 1 further shows a spring 124 (e.g., a coil spring) providing the required bias. There may be a circumferential array of such springs about the axis 500 each under axial compression.

In one group of examples discussed below, the second member 110 is rotating in an inertial frame of reference while the first member 102 is either stationary or counter-rotating. The rotating of the member 110 may create a centrifugal oil flow action discussed further below.

Figure 1A:
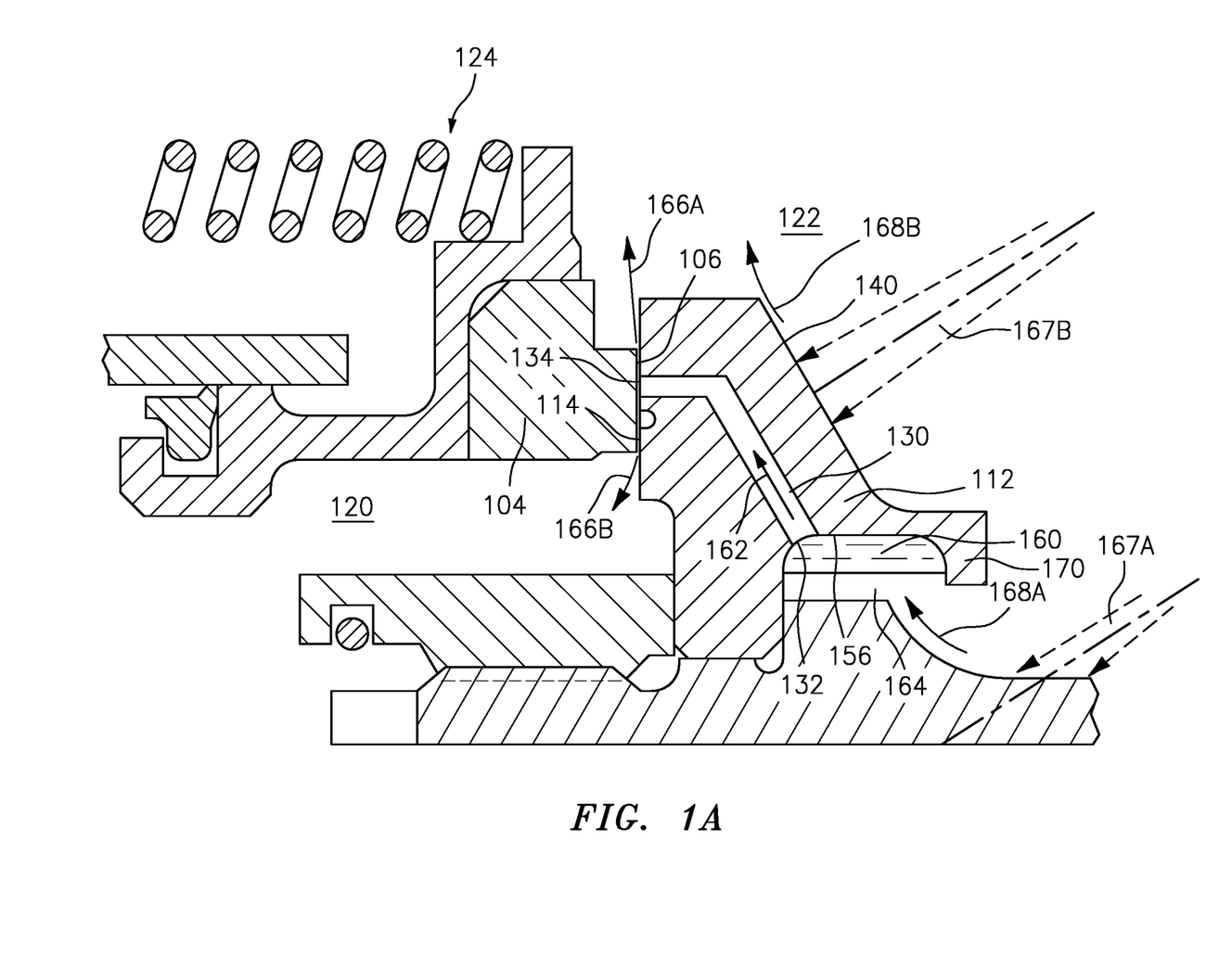
FIG. 1A is an enlarged view of a sealing interface area of the seal system of FIG. 1 in a first mode of operation.

In operation, the relative rotation produces frictional heating at the sliding interface between the faces 106 and 114. Cooling to dissipate this heat is therefore desirable. As discussed above, it is well-known to provide a circumferential array of oil flow passages through a seat in dry face or wet face configurations. These are typically drilled after machining gross features of the seat. FIG. 1A shows the seat piece 112 as having a circumferential array of passageways 130. The exemplary passageways each extend from a radially inboard opening or port 132 to a radially outboard opening or port 134 in the seat face 114. The passageways 130 may correspond to passageway configurations of a baseline wet face seal or may be modified. The passageways 130 may be machined in the piece 112 by conventional methods such as drilling. An exemplary number of passageways 130 is 10 to 100, more particularly 20 to 80 or 25 to 55 in seal sizes used on gas turbine engines.

FIG. 1A further shows the passageways 130 open to a surface portion 156 of the piece 112 at their ports 132. An exemplary drilling involves straight drilling of two legs of each passageway: one leg drilled from the face 114 essentially axially; and another leg drilled to meet it from the surface portion 156 at an angle off-axial and off-radial.

In operation, centrifugal action causes an accumulation 160 of oil to be captured by the second member 110 in a radially outwardly closed collection channel 164. The passageway opening ends 132 form outlets from the collection channel allowing oil flows 162 to pass outward through the passageways to the interface of mating faces 106, 114. The flows 162 from the individual passageways 130 merge to form a film at the interface and may leave and flow radially outward or inward to be discharged as a weepage or discharge flow 166A, 166B. The oil flow 162 when in the passageways cools the seat piece 112 and, thereby, cools the seat face and seal face.

To form the channel 164, FIG. 1A shows a weir formed by an annular inwardly projecting lip 170 of the seat piece 112. As an oil source, FIG. 1 shows an oil pump 180 delivering oil from a reservoir 182 via a conduit 184. The conduit 184 may terminate at one or more nozzles 186A, 186B. Each nozzle may have a respective outlet 188A, 188B discharging a spray (flow or discharge) 167A, 167B of the oil. The exemplary sprays are of circular cross-section having spray axes 530A and 530B, respectively. Exemplary nozzles are inserts (e.g., threaded) in bodies 190A and 190B (e.g., cast metal), respectively. The sprayed oil 167A from the nozzle 186A collects on a surface of the first member and is slung radially outward as a flow 168A to the channel 164. Oil may be collected and returned to the reservoir 182 by a conventional collection apparatus (not shown).

In at least one mode of operation, the first nozzle 186A and its discharged spray 167A function as in a conventional wet face situation. In at least one mode of operation, the second nozzle 186B and its spray 167B cool the seat piece 112 without flowing to the interface. FIG. 1A shows the spray 167B impacting a back face 140 of the seat piece 112 and forming a deflected flow 168B slung radially outward by centrifugal action and ultimately collected and returned to the reservoir 182.

A particular example of modes involves a first mode (FIGS. 1 and 1A) wherein both nozzles 186A, 186B are discharging. This provides both the wet face lubrication and cooling of the first spray 167A and the additional cooling of the second spray 167B. A second mode (FIG. 1B) involves only the flow 167B to provide dry face operation. To provide these two modes, the exemplary FIG. 1 system includes a valve 220. The exemplary valve 220 is in a flowpath/conduit branch feeding the first nozzle 186A downstream of junction with the branch feeding the second nozzle 186B. The exemplary valve 220 is a controllable on-off bi-static valve such as a solenoid valve. It may be coupled to a controller such as via control wiring 222 or other interface. Thus, the first mode involves the valve 220 being open and the second mode involves the valve 220 being closed.

Yet alternative or additional modes and alternative systems for providing those modes are possible. One alternative or additional mode has flow only through the first nozzle 186A and not the second nozzle 186B. Yet further modes involve proportioning flows between the two nozzles. Thus, for example, there may be valves 220 in both branches or there may be a multi-state three-way valve at the junction of the branches.

Selection of which of the modes to operate in may reflect one or more of several considerations and associated measured or calculated parameters. One noteworthy parameter involves the pressure difference between the regions or spaces 120 and 122. Although this pressure difference may be directly measured via pressure sensors (not shown) such as piezoelectric transducers, alternative implementations use other factors that correlate with pressure. In examples of gas turbine engines (discussed further below) the pressure difference may generally correlate with engine speed. In one example, the pressure in region 120 is typically greater than that in region 122. Seal geometry may be such that the pressure difference helps bias the seal 104 into engagement with the seat. In the example, the pressure difference increases with speed. Thus, the pressure bias component (which may be in addition to spring bias) increases with speed. With a conventional wet face seal, low speed operation may lack sufficient bias to keep weepage below a desired threshold. Accordingly, the low speed operation may use the second mode of FIG. 1B. High speed operation may use the first mode of FIG. 1A. In one simple example, a conventional engine speed sensor is used with a fixed threshold speed for switchover between modes.

In various implementations, the use of the two modes may have one or more of several advantages relative to any particular baseline. For example, in one example of reengineering of a baseline wet face seal system, the spring bias may be reduced because there is reduced need to fight weepage. This results in reduced contact forces and pressures which increases seal life.

Figure 2:
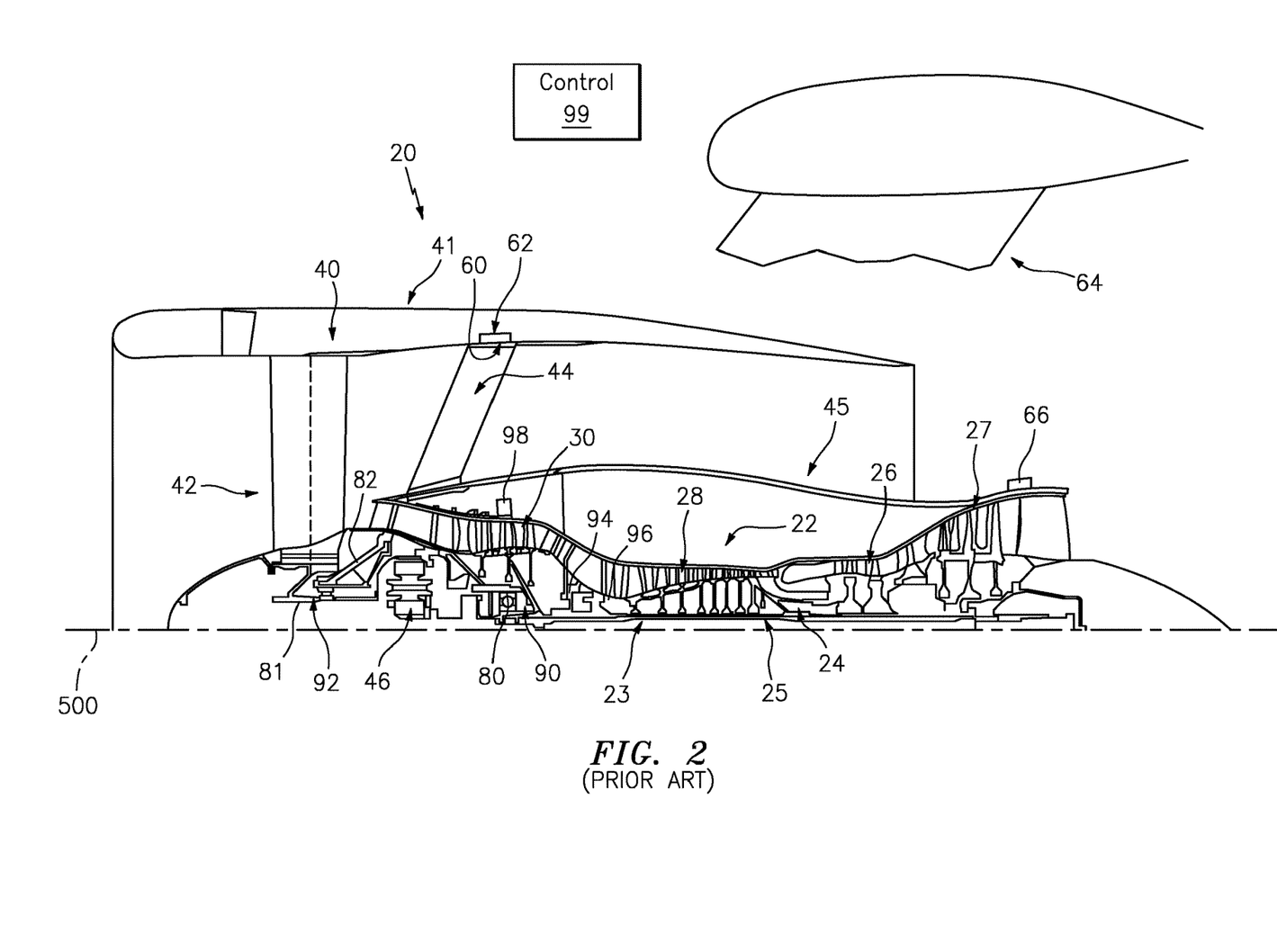
FIG. 2 is a partially schematic central axial sectional view of a gas turbine engine.

FIG. 2 shows a turbofan engine 20 having an engine case 22 containing a rotor shaft assembly 23. An exemplary engine is a turbofan. Alternatives include turbojets, turboprops, turboshafts, and industrial gas turbines. The exemplary turbofan is a two-spool turbofan. Via high 24 and low 25 shaft portions of the shaft assembly 23, a high pressure turbine (HPT) section 26 and a low pressure turbine (LPT) section 27 respectively drive a high pressure compressor (HPC) section 28 and a low pressure compressor (LPC) section 30. The engine extends along a longitudinal axis (centerline) 500 from a fore end to an aft end. Adjacent the fore end, a shroud (fan case) 40 encircles a fan 42 and is supported by vanes 44. An aerodynamic nacelle 41 around the fan case is shown and an aerodynamic nacelle 45 around the engine case is shown.

Although a two spool (plus fan) engine is shown, an alternative variation involves a three spool (plus fan) engine wherein an intermediate spool comprises an intermediate pressure compressor (IPC) between the LPC and HPC and an intermediate pressure turbine (IPT) between the HPT and LPT. In another aspect a three-spool engine, the IPT drives a low pressure compressor while the LPT drives a fan, in both cases either directly or indirectly via a transmission mechanism, for example a gearbox.

In the exemplary embodiment, the low shaft portion 25 of the rotor shaft assembly 23 drives the fan 42 through a reduction transmission 46. An exemplary reduction transmission is an epicyclic transmission, namely a planetary or star gear system.

FIG. 2 also shows at their outboard ends, the vanes 44 have flanges 60 bolted to an inner ring structure of the fan case to tie the outboard ends of the vanes together. Integral therewith or fastened thereto is a forward mounting structure (e.g., clevises which form part of a four bar mechanism) and provides forward support to the engine (e.g., vertical and lateral support). To mount the engine to the aircraft wing, a pylon 64 is mounted to the structure 62 (e.g., forming the outer part thereof). The pylon is also mounted to a rear engine mount 66.

In one example, FIG. 2 shows a location 90 for the seal system 100 wherein the first member 102 may be mounted to (or integrally formed with) a static bearing support 80 and the second member 110 may be mounted to (or integrally formed with) a forward portion of the low shaft 25. Alternatively, in a location 92, the first member 102 may be mounted to (or integrally formed with) a static hub 82 and the second member 110 mounted to (or integrally formed with) a fan shaft 81. In these two illustrated examples, the seal system is positioned adjacent one end of a bearing system to isolate the bearing system. Similar locations may be provided for other bearings in the engine. For example, locations 94 and 96 may represent locations where the sealing is between the high spool and static structure on either side of a bearing supporting the high spool.

Figure 1B:
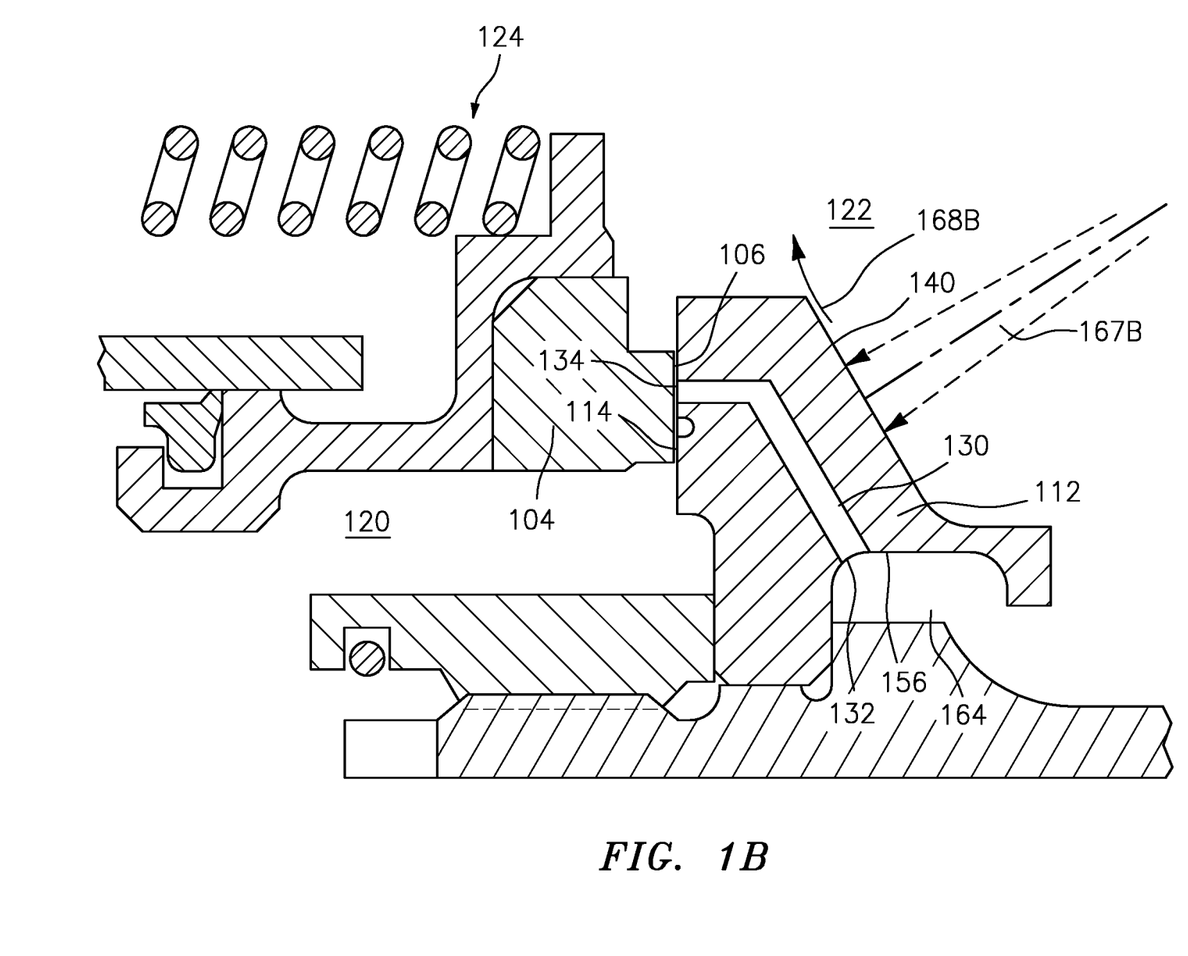
FIG. 1B is a view of the FIG. 1A sealing interface area in a second mode of operation.

FIG. 2 further shows, schematically, the aforementioned engine controller 99 and speed sensor 98 (e.g., magnetic or optical) which may be used to control switching between the FIG. 1A and FIG. 1B modes. In an exemplary implementation, the threshold speed is set slightly above specified ground idle speed so that in ground idle situations, there is only the FIG. 1B dry face operation. Above that speed, the controller operates the seal system in the FIG. 1A mode of wet face operation with supplemental cooling (or in the unillustrated pure wet face mode with no flow from the second nozzle).

Figure 3:
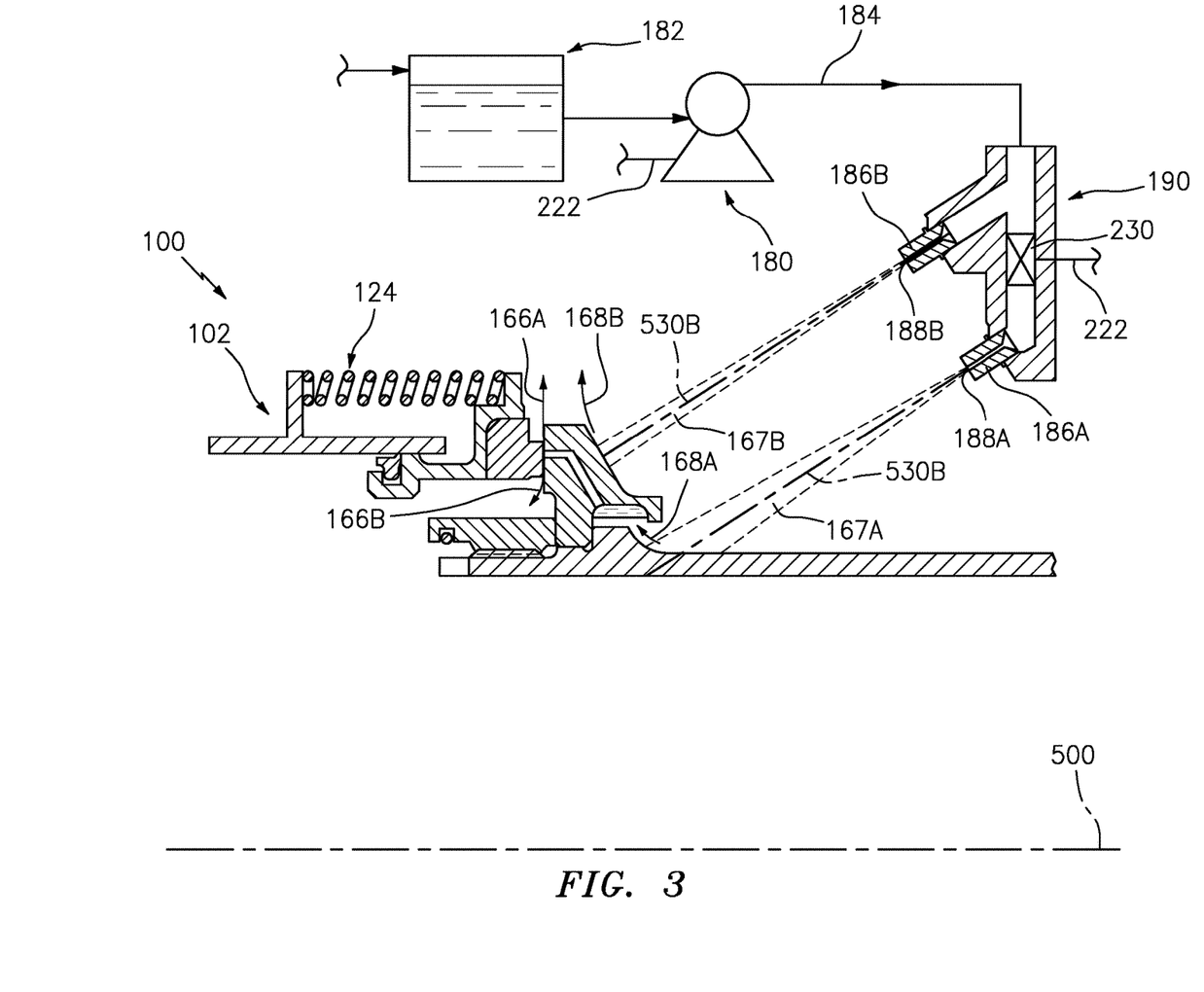
FIG. 3 is a partial partially schematic central axial sectional view of a second seal system in a first mode of operation.
Figure 4:
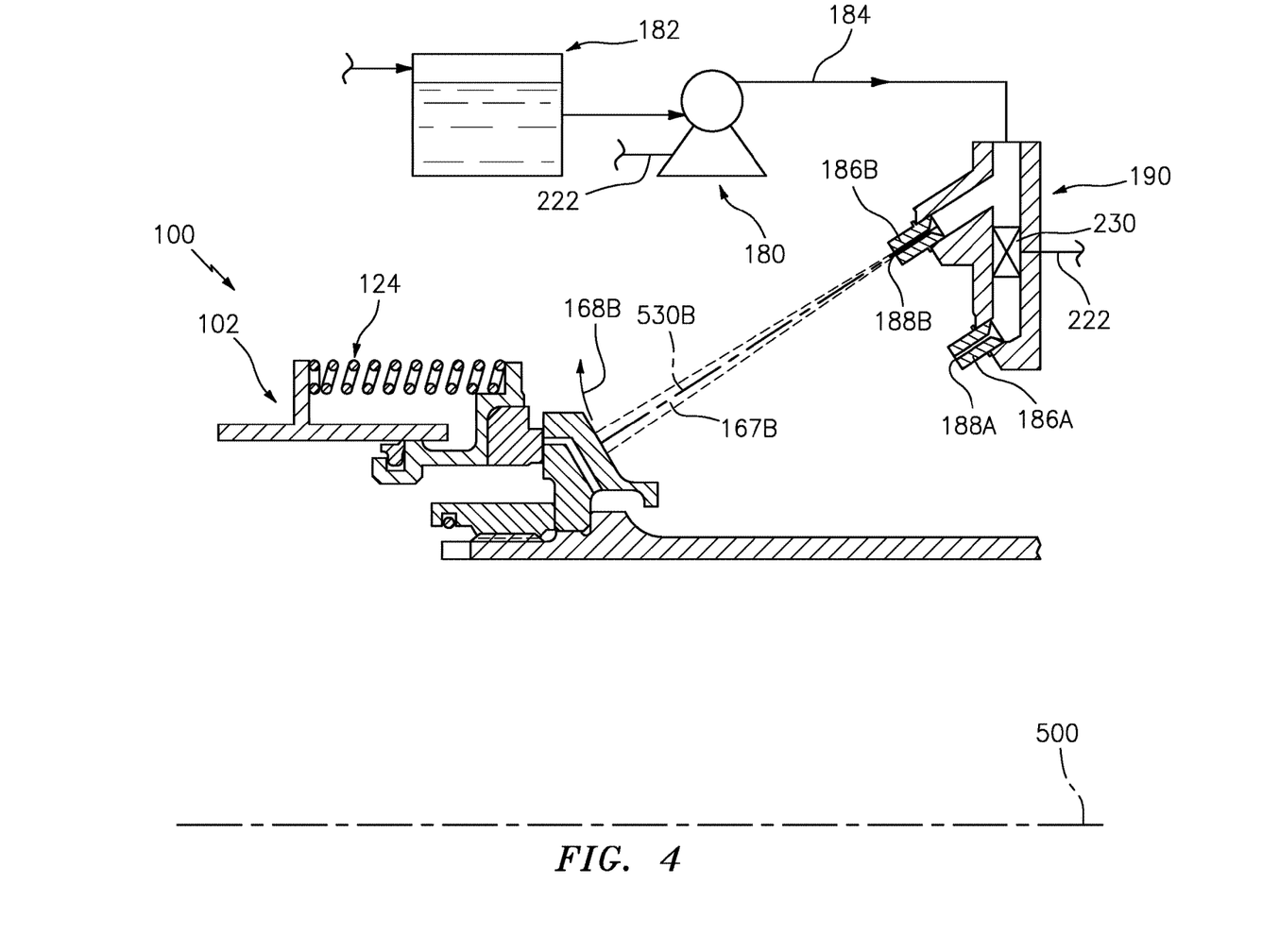
FIG. 4 is a view of the FIG. 3 second seal system in a second mode of operation.

FIG. 3 shows an alternate seal system configuration, otherwise similar to FIG. 1 with several exceptions. A first exception is that the two nozzles 186A and 186B are mounted in a common body (e.g., a casting) 190 so that the flowpath branches within the body. Relatedly, the valve 220 is replaced by a valve 230 mounted within the body 190. FIG. 3 shows a first mode similar to FIG. 1A and FIG. 4 shows a second mode similar to FIG. 1B.

The sealing system components and broader engine components may be made by conventional techniques. As noted above, one series of implementations involves retrofitting an existing engine that has only wet face operation and only the nozzle(s) 186A to add the nozzle(s) 186B and associated valve 220. Other more complicated reengineerings are possible.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline seal or machine configuration, details of such baseline may influence details of particular implementations. Accordingly, other embodiments are within the scope of the following claims.

What is claimed is:

1. A seal system comprising:
   a first member;
   a seal carried by the first member and having a seal face; and
   a second member rotatable relative to the first member about an axis and having:

a seat, the seat having a seat face in sliding sealing engagement with the seal face; and a circumferential array of passageway legs open to the seat face; and an oil pump for delivering oil via one or more first outlets to the passageway legs in at least a first mode of operation, wherein the seal system further comprises:

one or more second outlets, the oil pump coupled to the one or more second outlets to deliver oil to a backside of the seat in at least a second mode of operation.

2. The seal system of claim 1 wherein:
the seal is a carbon seal.

3. The seal system of claim 1 wherein:
the seat is steel.

4. The seal system of claim 1 wherein:
the seal and seat are full annular.

5. The seal system of claim 1 further comprising:
a spring biasing the seal into engagement with the seat.

6. The seal system of claim 1 further comprising:
one or more valves for switching between the first mode and the second mode.

7. The seal system of claim 6 wherein:
the one or more valves comprises a first valve positioned along a flowpath from the pump to the one or more first outlets downstream of a branching to the one or more second outlets.

8. The seal system of claim 6 wherein:
the one or more valves consists of a single valve;
the one or more first outlets consists of a single first outlet; and
the one or more second outlets consists of a single second outlet.

9. The seal system of claim 6 wherein:
the one or more valves are positioned to allow flow through the second outlets in the first mode and the second mode and block flow through the first outlets in the second mode.

10. The seal system of claim 1 further comprising a nozzle body wherein:
one of the first outlets is in a first insert in the nozzle body; and
one of the second outlets is in a second insert in the nozzle body.

11. The seal system of claim 10 further comprising a valve in the nozzle body positioned to selectively block flow through the first insert.

12. A gas turbine engine including the seal system of claim 1 wherein:
the second member is a shaft.

13. The gas turbine engine of claim 12 further comprising:
a speed sensor; and
a controller configured to switch between the first mode and the second mode responsive to output from the speed sensor.

14. A method for using the seal system of claim 1, the method comprising:
shifting between the first mode and the second mode.

15. The method of claim 14 wherein:
in the first mode, oil is not delivered via the second outlets; and
in the second mode, oil is not delivered via the first outlets.

16. The method of claim 14 wherein:
in the first mode, oil is also delivered via the second outlets; and
in the second mode, oil is not delivered via the first outlets.

17. The method of claim 16 wherein:
in the first mode, the relative rotation is at a first speed; and
in the second mode, the relative rotation is at a second speed, less than the first speed.

18. The method of claim 14 wherein:
in the first mode, the relative rotation is at a first speed; and
in the second mode, the relative rotation is at a second speed, less than the first speed.

19. The seal system of claim 1 wherein:
the second member has a radially inwardly open collection channel; and
the passageways extend from the collection channel.

20. The seal system of claim 19 wherein:
the one or more second outlets are positioned to spray said oil against said backside of the seat.

21. The seal system of claim 1 wherein:
in the second mode, oil is not delivered via the first outlets.

* * * * *